United States Patent
Ganapathy et al.

(10) Patent No.: US 6,598,155 B1
(45) Date of Patent: Jul. 22, 2003

(54) METHOD AND APPARATUS FOR LOOP BUFFERING DIGITAL SIGNAL PROCESSING INSTRUCTIONS

(75) Inventors: Kumar Ganapathy, Mountain View, CA (US); Ruban Kanapathipillai, Fremont, CA (US); Kenneth Malich, Norco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/494,609

(22) Filed: Jan. 31, 2000

(51) Int. Cl.[7] .................................................. G06F 9/00
(52) U.S. Cl. ...................................... 712/241; 711/110
(58) Field of Search ........................ 712/241; 717/160; 711/110

(56) References Cited

U.S. PATENT DOCUMENTS

| 5,511,178 A | | 4/1996 | Takeda et al. ............... 711/125 |
|---|---|---|---|
| 5,526,397 A | | 6/1996 | Lohman ...................... 455/560 |
| 5,579,493 A | | 11/1996 | Kiuchi et al. ................ 712/207 |
| 5,872,989 A | * | 2/1999 | Tsushima et al. ........... 712/217 |
| 5,951,679 A | * | 9/1999 | Anderson et al. ........... 712/241 |
| 6,085,315 A | * | 7/2000 | Fleck et al. .................. 712/241 |
| 6,269,440 B1 | * | 7/2001 | Fernando et al. ........... 709/106 |
| 6,367,071 B1 | * | 4/2002 | Cao et al. .................... 717/160 |

OTHER PUBLICATIONS

William Stallings, Computer Organization and Architecture Designing for Performance, Fourth Edition, 1996, Prentice–Hall, pp. 400–412.

Jean–Loup Baer, Computer Systems Architecture, 1980, Computer Science Press, Inc., pp. 500–506.

Richard Y. Kain, Advanced Computer Architecture A Systems Design Approach, 1996, Prentice Hall, pp. 612–614.

* cited by examiner

*Primary Examiner*—Eric Coleman
(74) *Attorney, Agent, or Firm*—Blakely, Sokoloff, Taylor & Zafman LLP

(57) ABSTRACT

A loop buffer for storing and holding instructions executed within loops for digital signal processing. Control logic detects the beginning and ending of a loop to signal the loop buffer control logic to start instruction execution in a cyclical fashion using the instructions stored within the loop buffer. After completion of the required number of loops, the instructions in the loop buffer are overwritten with new instructions until the next loop is to be processed. The loop buffer conserves power by avoiding the fetching of instructions unnecessarily from memory.

14 Claims, 18 Drawing Sheets

FIG. 6C

| 39 | 38 | 37 | 36 | 35 | 34 33 32 31 30 29 28 27 | 26 25 24 | 23 | 22 21 20 | 19 | 18 | 17 | 16 15 14 13 12 | 11 10 9 | 8 | 7 | 6 | 5 | 4 | 3 2 | 1 | 0 |
|---|---|---|---|---|---|---|---|---|---|---|---|---|---|---|---|---|---|---|---|---|---|
| 1 | 0 | 0 | PS | S' | SX | SY | V/SSA | DA | Sub-op | 1 | Pred | PL | Sxt | Syt | Rnd | S' | S' | S' | 0 | SA DA | abs | 0 |

| SX | SY | V/SSA | Sub-op | Rnd |
|---|---|---|---|---|
| da=+/− sx*sy | Nop | 0 | 0 0 0 | |
| da=+/− (sx*sy)+sa | Add | 0 | 0 0 1 | Lt |
| da=+/− (sx*sa)+sy | Add | 1 | 0 1 0 | Lt |
| da=+/− (sx*sy)−sa | Sub | 0 | 0 1 1 | Lt |
| da=+/− (sx*sa)−sy | Sub | 1 | 1 0 0 | Lt |
| da=min(+/− sx*sy,sa) | Min | 0 | 1 0 1 | Gx |
| da=min(+/− sx*sa,sy) | Min | 1 | 1 1 0 | Gx |
| da=max(+/− sx*sy,sa) | Max | 1 | 1 1 1 | Gx |

FIG. 6D

| 39 | 38 | 37 | 36 | 35 | 34 33 32 31 30 29 28 27 | 26 25 24 | 23 | 22 21 20 |
|---|---|---|---|---|---|---|---|---|
| 1 | 0 | 0 | PS | S' | SX | SY | V/SSA | DA |

| SY | V/SSA DA | 22 21 20 | |
|---|---|---|---|
| Add | 0 | 1 0 0 | da=+/− (mx'sa)+my |
| Sub | 0 | 1 0 0 | da=+/− (mx'sa)−my |
| Min | 0 | 1 1 0 | da=min(+/−mx'sa,my) |

20-bit ISA

| 39 | 19 | | |
|---|---|---|---|
| 0 | 0 | 20-bit parallel | Control () Control |
| 0 | 1 | 20-bit serial | Control # Control |
| 1 | 0 | 40-bit extended | DSP extensions/Shadow |
| 1 | 1 | 20-bit serial | DSP # DSP |

DSP instructions

| | 39 | 38 | 37 | 36 | 35 | 34 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multiply | 1 | 0 | 0 | PS | S' | SX | | | | | SY | | | | V/S | SA | DA | Sub-op | | | |
| da=sx*sy | | | | | | | | | | | | | | | | | | 0 | 0 | 0 | Nop |
| da=(sx*sy)+sa | | | | | | | | | | | | | | | | | | 0 | 0 | 1 | Add |
| da=(sx*sa)+sy | | | | | | | | | | | | | | | | | | 0 | 1 | 0 | Add |
| da=(sx*sy)+sa | | | | | | | | | | | | | | | | | | 0 | 1 | 1 | Sub |
| da=(sx*sa)+sy | | | | | | | | | | | | | | | | | | 1 | 0 | 0 | Sub |
| da=min(sx*sy,sa) | | | | | | | | | | | | | | | | | | 1 | 0 | 1 | Min |
| da=min(sx*sa,sy) | | | | | | | | | | | | | | | | | | 1 | 1 | 0 | Min |
| da=max(sx*sy,sa) | | | | | | | | | | | | | | | | | | 1 | 1 | 1 | Max |
| Add | 1 | 0 | 1 | PS | +/- | SX | | | | | SY | | | | V/S | SA | DA | Sub-op | | | |
| da=sx+sy | | | | | | | | | | | | | | | | | | 0 | 0 | 0 | Nop |
| da=sx+sy+sa | | | | | | | | | | | | | | | | | | 0 | 0 | 1 | Add |
| da=sx+sy: sa=sx+sy: | | | | | | | | | | | | | | | | | | 0 | 1 | 0 | AddSub |
| da=(sx+sy)*sa | | | | | | | | | | | | | | | | | | 0 | 1 | 1 | Mul |
| da=-(sx+sy)*sa | | | | | | | | | | | | | | | | | | 1 | 0 | 0 | MulN |
| da=min(sx+sy,sa) | | | | | | | | | | | | | | | | | | 1 | 0 | 1 | Min |
| da=max(sx+sy,sa) | | | | | | | | | | | | | | | | | | 1 | 1 | 0 | Max |
| da=ssum(sa)   (sx,sy unused) | | | | | | | | | | | | | | | | | | 1 | 1 | 1 | CombAdd |
| Extremum | 1 | 1 | 0 | PS | x/n | SX | | | | | SY | | | | V/S | SA | DA | Sub-op | | | |
| da=ext(sx,sy) | | | | | | | | | | | | | | | | | | 0 | 0 | 0 | Nop |
| da=ext(sx,sy,sa) | | | | | | | | | | | | | | | | | | 0 | 0 | 1 | Ext |
| da=ext(sx,sa)*sy | | | | | | | | | | | | | | | | | | 0 | 1 | 0 | Mul |
| da=-ext(sx,sa)*sy | | | | | | | | | | | | | | | | | | 0 | 1 | 1 | MulN |
| da=ext(sx,sa)+sy | | | | | | | | | | | | | | | | | | 1 | 0 | 0 | Add |
| da=ext(sx,sa)-sy | | | | | | | | | | | | | | | | | | 1 | 0 | 1 | Sub |
| ext(sa,da) ?1=sx,tr=sy,lcs=lc | | | | | | | | | | | | | | | | | | 1 | 1 | 0 | amax |
| type-match | 1 | 1 | 0 | PS | 0 | SX | | | | | SY | | | | x | x | x | 1 | 1 | 1 | |
| Permute | 1 | 1 | 0 | PS | 1 | SX | | | | | Type | | | | x | ereg | | 1 | 1 | 1 | Permute |
| Reserved | 1 | 1 | 1 | PS | x | SX | | | | | SY | | | | SA | DA | V/S | Sub-op | | | |

FIG. 6E-1

Control and specifier Extensions

| 19 | 18 17 | 16 15 14 | 13 12 | 11 10 | 9 | 8 | 7 | 6 | 5 | 4 | 3 | 2 | 1 | 0 |

Mul

| 0 | Pred | PL | Sxt | Syt | Rnd | S' | S' | S' | 0 | SA | DA | abs | 0 | 0 |

Lt
Gx

Add/Sub
min/max

Add

| 0 | Pred | PL | Sxt | Syt | Lt | Sub-ext | 0 | SA | DA | abs | 0 | 0 |

+/- +/- +/- x
x V/S Rnd Fp
tr/ctl Gx Fp

Nop (uadd)
Mul/MulN
Min/Max

Ext

| 0 | Pred | PL | Sxt | Syt | tr-ctl | Gx | Sub-ext | 0 | SA | DA | abs | 0 | 0 |

Lt Fp
Rnd V/S

Add/sub
Mul

| 0 | Pred | PL | Sxt | Syt | Pctl1 | 0 | ereg | Pcll | 0 | 0 |

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |

| 0 | Pred | PL | x | Type:SX | Type:SY | 0 | SA | DA | x | 0 | 1 | Type override |
| 0 | Pred | PL | Psx | Permute:SX | Permute:SY | 0 | SA | DA | Psy | 1 | 0 | permute override |
| 0 | Pred | I/R | I/R | prX | Offset:SX | Offset:SY | 0 | SA | DA | prY | 1 | 1 | Offset override |

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |

| 0 | Op | PL | op | ereg | ereg | 1 | SA | DA | Sub-op |

FIG. 6E-2

Control instructions

| | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|
| add,sub | L | Pred | | 0 | 0 | 0 | RX | | | | RY | | | | RZ | | | +/− | | 0 | |
| max,min | L | Pred | | 0 | 0 | 0 | RX | | | | RY | | | | RZ | | | X/N | | 1 | |
| Shift | L | Pred | | 0 | 0 | 1 | RX | | | | UI4 | | | | RZ | | | UI2 | R/L | | <Bit1,Bits9−6> |
| Logic | L | Pred | | 0 | 1 | 0 | RX | | | | RY | | | | RZ | | | &, | &1 | | ==UI5 (Shift |
| Mux | L | Pred | | 0 | 1 | 1 | RX | | | | RY | | | | RZ | | | Pd | | 0 | Amount) |
| mov | L | Pred | | 0 | 1 | 1 | RX | | | | DZ | | Rxt | Dzl | 0 | 0 | | 0 | | 1 | |
| addi | L | Pred | | 0 | 1 | 1 | SI4 | | | | DZ | | x | x | 1 | 0 | | 0 | | 1 | |
| mov2erg | L | Pred | | 0 | 1 | 1 | RX | | | | unit | | ereg | | qd | | type | | 1 | 0 | 1 | |
| l.dm | L | Pred | | 0 | 1 | 1 | RX | | | | DZ1 | | | | DZ2 | | | 1 | 1 | 1 | |
| Set4bits | L | Pred | | 1 | 0 | 0 | UI4:POS | | | | RZ | | | | Rzt | | UI4 | | | 0 | |
| Set2bits | L | Pred | | 1 | 0 | 0 | UI4:POS | | | | RZ | | | | Rzt | UI2 | | 0 | | 1 | |
| Setbit | L | Pred | | 1 | 0 | 0 | UI4:POS | | | | RZ | | | | Rzt | UI1 | UI1 | 1 | | 1 | <Bit3,Bits13− |
| Movi | L | Pred | | 1 | 0 | 0 | SI8 | | | | | | | | RZ | | | 1 | | 1 | 10>==UI5 POS |
| Jmp | L | Pred | | 1 | 0 | 1 | SI9 | | | | | | | | 0 | PRED | | 0 | | 0 | |
| Call | L | Pred | | 1 | 0 | 1 | SI9 | | | | | | | | 1 | PRED | | 0 | | 0 | |
| Loop | L | Pred | | 1 | 0 | 1 | UI5:Lcount | | | | | UI5:Lsize | | | | | UI2:Lst | 0 | | 1 | |
| Jmpi | L | Pred | | 1 | 0 | 1 | RX | | | | x | x | x | x | 0 | PRED | | 1 | | 0 | |
| Calli | L | Pred | | 1 | 0 | 1 | RX | | | | x | x | x | x | 1 | PRED | | 1 | | 0 | |
| Loopi | L | Pred | | 1 | 0 | 1 | RX | | | | x | | UI5:Lsize | | | | UI2:Lst | 1 | | 1 | |
| Test | L | Pred | | 1 | 1 | 0 | RX | | | | RY | | | | PZ | | | =,<,> | | 0 | |
| Testbit | L | Pred | | 1 | 1 | 0 | RX | | | | UI5 | | | | PZ | | | B | | 1 | |
| Andp, orp | L | Pred | | 1 | 1 | 0 | Pa | | Pb | | | Pc | | | PZ | | | & | | 1 | |
| Load | L | Pred | | 1 | 1 | 1 | MX | | | | RZ | | | | Ext | | | 0 | | 0 | |
| Store | L | Pred | | 1 | 1 | 1 | MZ | | | | RZ | | | | Ext | | | 1 | | 0 | |
| eLoad | L | Pred | | 1 | 1 | 1 | MX | | | | RY | | | | 1 | 1 | 1 | 0 | | 0 | |
| eStore | L | Pred | | 1 | 1 | 1 | MZ | | | | RY | | | | 1 | 1 | 1 | 0 | | 0 | |
| Extended | L | Pred | | 1 | 1 | 1 | Bits 27:16 | | | | | | | | | | | 1 | | 0 | |
| Logic2 | L | Pred | | 1 | 1 | 1 | RX | | | | RY/RZ | | | | Rxt | Ryt | &,1,&1,! | 0 | | 1 | |
| mov−erg | L | Pred | | 1 | 1 | 1 | unit | | ereg | | | RZ | | | qd | Sft | | 0 | | 1 | |
| Crb | L | Pred | | 1 | 1 | 1 | RX | | | | RZ | | | | s/m | 0 | 0 | 1 | | 1 | |
| Panty | L | Pred | | 1 | 1 | 1 | RX | | | | PZ | | 0/E | | 0 | 1 | 0 | 1 | | 1 | |
| Stm | L | Pred | | 1 | 1 | 1 | MZ | | | | RX | | | | 1 | 1 | 0 | 1 | | 1 | |
| Abs | L | Pred | | 1 | 1 | 1 | RX | | | | RZ | | | | 0 | 0 | 1 | 1 | | 1 | |
| Neg | L | Pred | | 1 | 1 | 1 | RX | | | | RZ | | | | 0 | 1 | 1 | 1 | | 1 | |
| Div−step | L | Pred | | 1 | 1 | 1 | RX | | | | RZ | | | | 1 | 0 | 1 | 1 | | 1 | |
| Test&Set | L | Pred | | 1 | 1 | 1 | RX | | | | PZ | | | 0 | 1 | 1 | 1 | 1 | | 1 | |
| Reserved | L | Pred | | 1 | 1 | 1 | | | | | 0 | 0 | 1 | 1 | 1 | 1 | 1 | 1 | | 1 | |
| Return | L | Pred | | 1 | 1 | 1 | Pred | | l−ctl | | 0 | 1 | 0 | 1 | 1 | 1 | 1 | 1 | | 1 | |
| Zero−ac | L | Pred | | 1 | 1 | 1 | ac # | | | | 1 | 1 | 0 | 1 | 1 | 1 | 1 | 1 | | 1 | |
| eSync | L | Pred | | 1 | 1 | 1 | RZ | | | | 0 | 1 | 1 | 1 | 1 | 1 | 1 | 1 | | 1 | |
| Swi | L | Pred | | 1 | 1 | 1 | UI3 | | | 0 | 1 | 1 | 1 | 1 | 1 | 1 | 1 | 1 | | 1 | |
| Nop | L | Pred | | 1 | 1 | 1 | UI3 | | | 1 | 1 | 1 | 1 | 1 | 1 | 1 | 1 | 1 | | 1 | |

FIG. 6F

Extended Control

| | Bits 13:2 of upper half (39:20) | | | | | | | | | | | | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|
| | 13 | 12 | 11 | 10 | 9 | 8 | 7 | 6 | 5 | 4 | 3 | 2 | | | | | | | | | | | | | | | | | | | | | |
| Insert/Extract | RX | | | | RZ | | | | 0 | 0 | 0 | 0 | 0 | x | x | 0 | Rxt | Rzt | I/E | R/I | R/I | Offset:UI5 | | | | Length:UI5 | | | | RV | | | |
| Inserti | UI4 length | | | | RZ | | | | 0 | 0 | 0 | 0 | 0 | x | x | 0 | Rzt | | UI5 Position | | | | Imm10 | | | | | | | | | | |
| Shift | RX | | | | RY | | | | 0 | 0 | 0 | 1 | 0 | x | x | 0 | rzh | rzt | D | U/S | 1 | | Shift UI5 | | | A/L | Lt | R/L | 0 | Fill | 1 | Fill: Sign/Zero |
| Rotate | RX | | | | RY | | | | 0 | 0 | 0 | 1 | 0 | x | x | 0 | rzh | | 0 | | 1 | | Shift UI5 | | | 1 | x | R/L | 1 | x | 1 | |
| jmp, call | | UI7 | | | | | | J/C | 0 | 0 | 1 | 0 | 0 | Pred | | 0 | x | | | | | | UI15 | | | | | | | | 0 | Bit 15 is continuation of inner LC |
| dloop | UI4 outer LC | | | | LC | | | | 0 | 0 | 1 | 1 | 0 | x | exit | 0 | UI1 | UI4 outer Lsize | | | | UI4 inner Lsize | | | UI2 C-Ls | | UI4 inner Lstart | | | | 0 | |
| dloopi | RX | | | | RY | | | | 0 | 0 | 1 | 1 | 0 | x | exit | 0 | 0 | UI4 outer Lsize | | | | UI4 inner Lsize | | | UI2 C-Ls | | UI4 inner Lstart | | | | 1 | |
| mult | RX | | | | RY | | | | 0 | 0 | 1 | 0 | 0 | x | x | 0 | 0 | rxh | md | ryh | +/- | RZ | | | i/f | rzh | rzl | s/u | s/u | 0 | |
| add/sub | RX | | | | RY | | | | 0 | 0 | 1 | 0 | 0 | x | x | 0 | 0 | rxh | rxl | ryh | +/- | RZ | | | 1 | rzh | rzl | x | x | 1 | |
| Reserved | | | | | | | | | 0 | 0 | 1 | 1 | 0 | x | x | 0 | 1 | x | x | x | x | | | | | | | | | 0 | |
| logicp | RX | | | | PZ | | | | 0 | 1 | 0 | 0 | 0 | x | =>,< | 0 | 1 | T/F | T/F | T/F | &i | PY | | | | PV | | | x | 1 | andp,orp,andorp,orandp, pz=(px relop py) |
| Testi | RX | | | | PZ | | | | 0 | 1 | 0 | 0 | 0 | x | x | 0 | 1 | T/F | T/F | T/F | &i | Imm16 | | | | | | | | | relop pv |
| Movi | H/L | Fill | | | RZ | | | | 0 | 1 | 0 | 1 | 0 | x | x | 0 | | | | | | Imm16 | | | | | | | | | |
| loadi | | Type | | | RZ | | | | 0 | 1 | 1 | 0 | 0 | x | x | 0 | 0 | | | | 0 | | | | Type | | | | SI10 | | |
| storei | | Type | | | RX | | | | 0 | 1 | 1 | 0 | 0 | x | x | 0 | 0 | | | | 1 | | | | Type | | | | SI10 | | |
| loadt | RX | | | | RZ | | | | 0 | 1 | 1 | 1 | 0 | x | x | 0 | 1 | Rzt | | | 0 | Imm14 | | | | | | | | | |
| storet | M7 | | | | RX | | | | 0 | 1 | 1 | 1 | 0 | x | x | 0 | 1 | Rzt | | | 1 | Imm14 | | | | | | | | | |
| Add/subi | RX | | | | RZ | | | | 1 | 0 | +/- | 0 | 0 | L1 | s/u | 0 | 0 | | | | | Imm16 | | | | | | | | | |
| mini,maxi | RX | | | | RZ | | | | 1 | 0 | X/N | 1 | 0 | x | x | 0 | | | | | | Imm16 | | | | | | | | | |
| andi,on | RX | | | | RZ | | | | 1 | 1 | &i | H/L | 0 | x | x | 0 | | | | | | Imm16 | | | | | | | | | |

Shift:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | SX | | | | | DZ | | | | | | | | | Amount | | | | | | | PL | PS | Lt | Rot | Fill | A/L | 1 | 0 | Shift |
| Group | | Pred | | | | opcode | | | | SX | | | | | DZ | | | | | | | | | Amount | | | | | | | Position | | | | | I/E | 0 | 1 | Insert/extract |
| Group | | Pred | Imm2 | | | opcode | | | | DZ | | | | | | | | Imm14 | | | | | | | | | | | Length | | | | Position | | | | 0 | 0 | Setbits |

Immediate:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | op | | DZ | | | | | | SX | | | | | | | | Imm32 | | | | | | | | | | | | | | | | | | | | | 0 |
| Group | | Pred | | | | opcode | | | | | | | | | DZ | | | Imm16 | | | | | | | | | | | | | | Subop<br>MOV<br>ADD<br>SUB<br>MIN<br>MAX<br>AND<br>OR | | | | | | | 0 |

Test:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | SX | | | | | | | | SY | | | | | | | | DPz | | | | | Subop | | | | | | | | 0 |

Branch:

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| Group | | Pred | | | | opcode | | | | Imm20 | | | | | | | | | | | | | | | | | | | | | | | | | | | | | 0 |

Misc:

7-bit specifier Parallel Store, Parallel Load in DSP instructions

| 6 | 5 | 4 | 3 | 2 | 1 | 0 | | |
|---|---|---|---|---|---|---|---|---|
| M/R | | | | | | | | |
| 0 | 0 | 0 | SPR s0–s15 | | | | | |
| 0 | 0 | 1 | reserved | | | | | |
| 0 | 1 | 0 | ac-names | | | | | |
| 0 | 1 | 1 | gpr: r0–r15 | | | | | |
| 1 | 0 | ptr: (r0) to (r15) | | | | off | Mem[ptr]‖ptr +=idx | Always postupdate |
| 1 | 1 | offset: UI4 | | | | off | Mem[ptr + idx] | Always postupdate |
| | | | | | | | ptrp14,p15 | Always postupdate |

6-bit specifier DSP instructions

| 5 | 4 | 3 | 2 | 1 | 0 | | |
|---|---|---|---|---|---|---|---|
| M/R | | | | | | | |
| 0 | 0 | ac-names | | | | | |
| 0 | 1 | gpr: r0–r15 | | | | | |
| 1 | ptr: (r0) to (r15) | | | | off | | Always postupdate |

5-bit specifier RISC instructions

| 4 | 3 | 2 | 1 | 0 |
|---|---|---|---|---|
| 0 | spr: s0–s15 | | | |
| 1 | gpr: r0–r15 | | | |

4-bit specifier

| 3 | 2 | 1 | 0 |
|---|---|---|---|
| gpr: r0–r15 | | | |
| ptr: (r0–r7) off | | | |
| ereg | | | |

AP

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | permute | | | | | CB | idx1: UI3 (0–7) | | | xhr0: Si5 (−16to15) | | | | | | | | | | pl | | | | | | | | | |

RISC instructions
20-bit DSP instructions
20-bit Shadow DSP instructions ac-names

| 3 | 2 | 1 | 0 |     |
|---|---|---|---|-----|
| 0 | 0 | 0 | 0 | A0  |
| 0 | 0 | 0 | 1 | A1  |
| 0 | 0 | 1 | 0 | T   |
| 0 | 0 | 1 | 1 | TR  |
| 0 | 1 | 0 | 0 | A00 |
| 0 | 1 | 0 | 1 | A10 |
| 0 | 1 | 1 | 0 | T0  |
| 0 | 1 | 1 | 1 | TR0 |
| 1 | 0 | 0 | 0 | SX1 |
| 1 | 0 | 0 | 1 | SX1s |
| 1 | 0 | 1 | 0 | SX2 |
| 1 | 0 | 1 | 1 | SX2s |
| 1 | 1 | 0 | 0 | SY1 |
| 1 | 1 | 0 | 1 | SY1s |
| 1 | 1 | 1 | 0 | SY2 |
| 1 | 1 | 1 | 1 | SY2s |

A0 (use type, SIMD)

A00 (unit 0)

SPR:
gpr-type
ereg type
fu-ctl
pls-ctf
cb-ctl
loop-ctl
pcr
status ereg names

| 3 | 2 | 1 | 0 |     |
|---|---|---|---|-----|
| 0 | 0 | 0 | 0 | A0  |
| 0 | 0 | 0 | 1 | A1  |
| 0 | 0 | 1 | 0 | T   |
| 0 | 0 | 1 | 1 | TR  |
| 0 | 1 | 0 | 0 | PP0 |
| 0 | 1 | 0 | 1 | Aout |
| 0 | 1 | 1 | 0 | PP1 |
| 0 | 1 | 1 | 1 | Dout |
| 1 | 0 | 0 | 0 | SX1 |
| 1 | 0 | 0 | 1 | SX1s |
| 1 | 0 | 1 | 0 | SX2 |
| 1 | 0 | 1 | 1 | SX2s |
| 1 | 1 | 0 | 0 | SY1 |
| 1 | 1 | 0 | 1 | SY1s |
| 1 | 1 | 1 | 0 | SY2 |
| 1 | 1 | 1 | 1 | SY2s |

FIG. 6I-2

METHOD AND APPARATUS FOR LOOP BUFFERING DIGITAL SIGNAL PROCESSING INSTRUCTIONS

FIELD OF THE INVENTION

This invention relates generally to digital signal processing devices. More particularly, the invention relates to instruction execution within digital signal processors.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fix filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

In typical micro processors, a MAC operation would require a multiply instruction and an add instruction to perform both multiplication and addition. To perform these two instructions would require two processing cycles. Additionally, a program written for the typical micro processor would require a larger program memory in order to store the extra instructions necessary to perform the MAC operation. In prior art DSP devices, if a DSP operation other than a MAC DSP instruction need be performed, the operation requires separate arithmetic instructions programmed into program memory. These separate arithmetic instructions in prior art DSPs similarly require increased program memory space and processing cycles to perform the operation when compared to a single MAC instruction. It is desirable to reduce the number of processing cycles when performing DSP operations. It is desirable to reduce program memory requirements as well.

DSPs are often programmed in a loop to continuously perform accelerated arithmetic functions including a MAC instruction using different operands. Often times, multiple arithmetic instructions are programmed in a loop to operate on the same data set. The same arithmetic instruction is often executed over and over in a loop using different operands. Additionally, each time one instruction is completed, another instruction is fetched from the program stored in memory during a fetch cycle. Fetch cycles require one or more cycle times to access a memory before instruction execution occurs. Because circuits change state during a fetch cycle, power is consumed and thus it is desirable to reduce the number of fetch cycles. Typically, approximately twenty percent of power consumption may be utilized in set up and clean up operations of a loop in order to execute DSP instructions. Typically, the loop execution where signal processing of data is performed consumes approximately eighty percent of power consumption with a significant portion being due to instruction fetching. Additionally, because data sets that a DSP device process are usually large, it is also desirable to speed instruction execution by avoiding frequent fetch cycles to memory.

Additionally, the quality of service over a telephone system often relates to the processing speed of signals. That is particularly the case when a DSP is to provide voice processing, such as voice compression, voice decompression, and echo cancellation for multiple channels. More recently, processing speed has become even more important because of the desire to transmit voice aggregated with data in a packetized form for communication over packetized networks. Delays in processing the packetized voice signal tend to result in the degradation of signal quality on receiving ends.

It is desirable to provide improved processing of voice and data signals to enhance the quality of voice and data communication over packetized networks. It is desirable to improve the efficiency of using computing resources when performing signal processing functions.

BRIEF SUMMARY OF THE INVENTION

Briefly, the present invention includes a method, apparatus and system as described in the claims. Multiple application specific signal processor (ASSP) having the instruction set architecture of the present invention, including the dyadic DSP instructions, are provided within gateways in communication systems to provide improved voice and data communication over a packetized network. Each ASSP includes a serial interface, a buffer memory, and four core processors in order for each to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute the digital signal processing algorithms in parallel. Each ASSP is flexible and can be programmed to perform many network functions or data/voice processing functions, including voice and data compression/decompression in telecommunications systems (such as CODECs) particularly packetized telecommunication networks, simply by altering the software program controlling the commands executed by the ASSP.

A loop buffer is provided for storing and holding instructions executed within loops for digital signal processing. Control logic detects the beginning and ending of a loop to signal the loop buffer control logic to start instruction execution in a cyclical fashion using the instructions stored within the loop buffer. After completion of the required number of loops, the instructions in the loop buffer are overwritten with new instructions until the next loop is to be processed.

This brief summary has been provided so that the nature of the invention may be understood quickly. A more complete understanding of the invention can be obtained by reference to the following detailed description of the preferred embodiment thereof in connection with the claims and the attached drawings.

BRIEF DESCRIPTIONS OF THE DRAWINGS

FIG. 6C is an exemplary bitmap for a control extended dyadic DSP instruction.

FIG. 6D is an exemplary bitmap for a non-extended dyadic DSP instruction.

FIG. 6E and 6F list the set of 20-bit instructions for the ISA of the present invention.

FIG. 6G lists the set of extended control instructions for the ISA of the present invention.

FIG. 6H lists the set of 40-bit DSP instructions for the ISA of the present invention.

FIG. 6I lists the set of addressing instructions for the ISA of the present invention.

Figure 7:
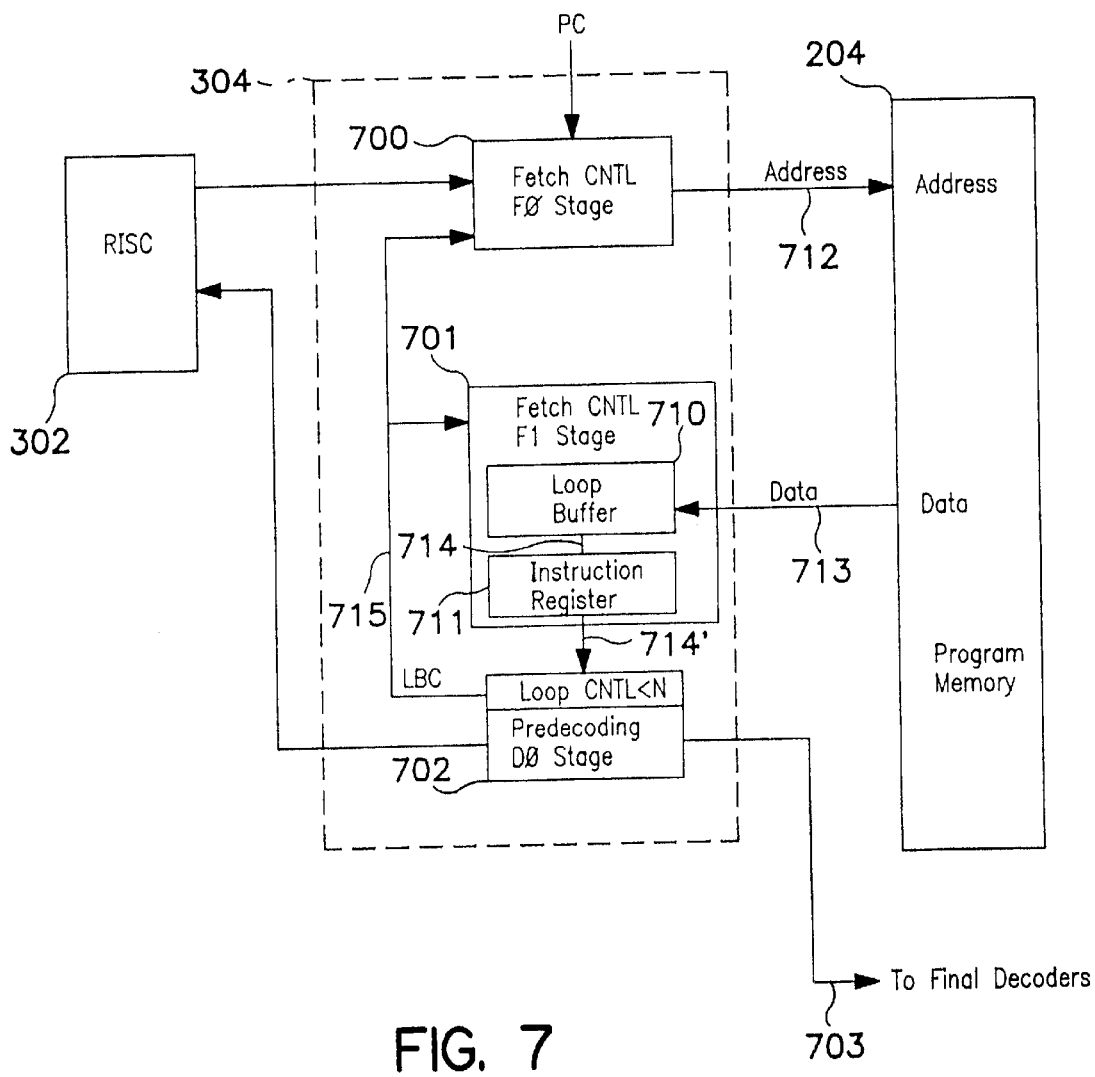

FIG. 7 is a functional block diagram illustrating instruction fetching and loop buffering for the signal processing units.

Figure 8A:
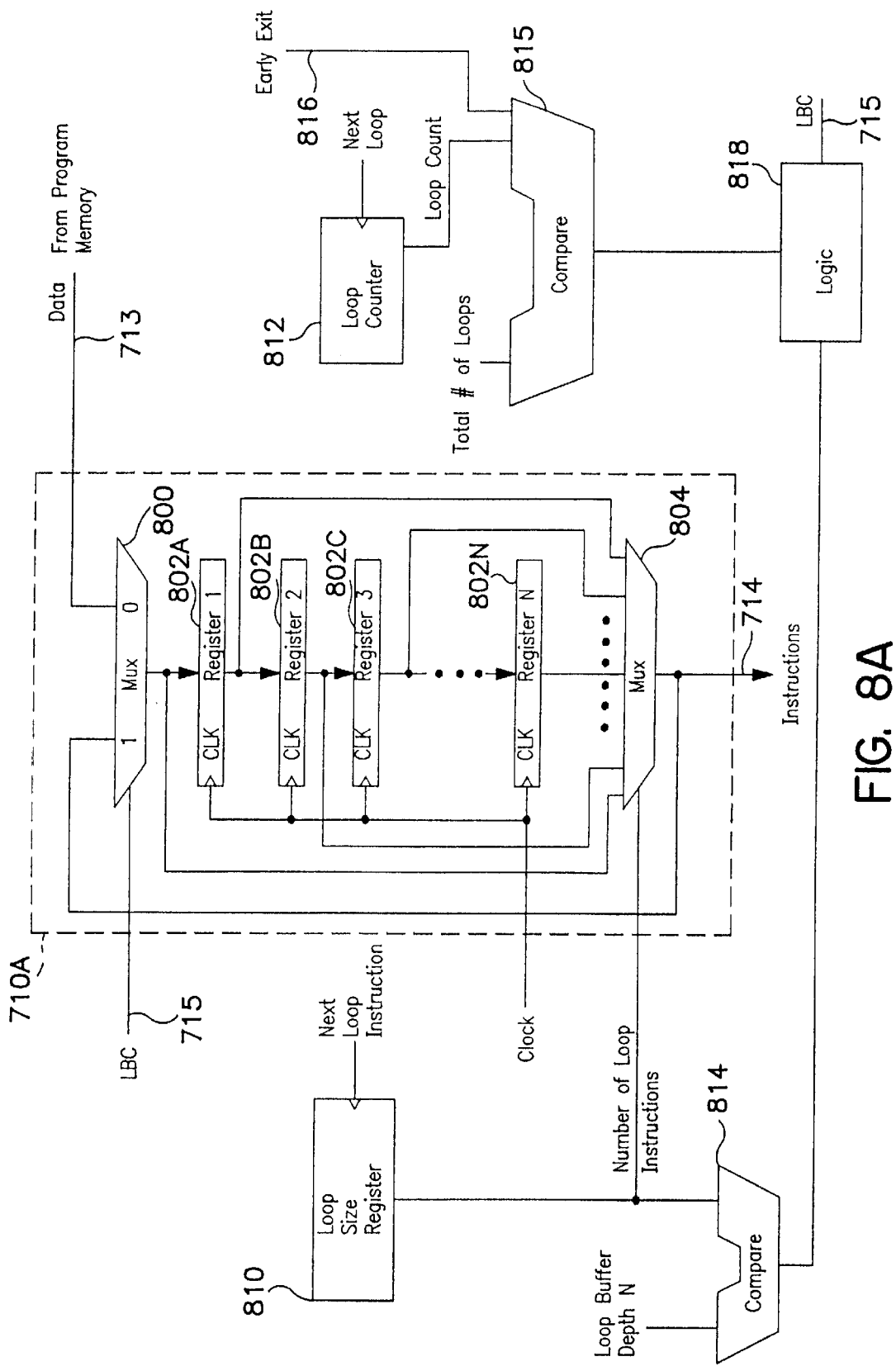

FIG. 8A is a detailed block diagram of the loop buffer and its control circuitry for one embodiment.

Figure 8B:
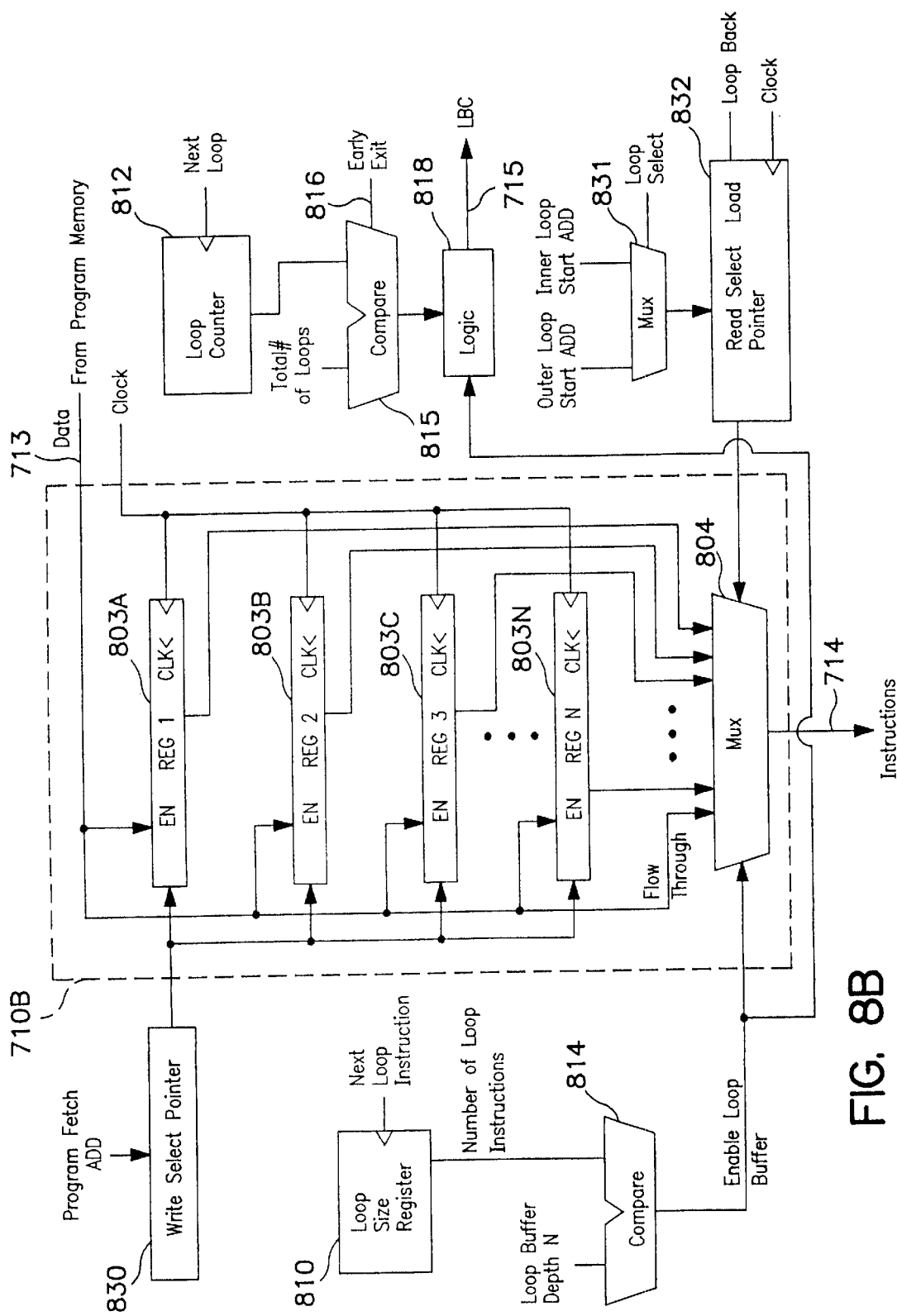

FIG. 8B is a detailed block diagram of the loop buffer and its control circuitry for the preferred embodiment.

Like reference numbers and designations in the drawings indicate like elements providing similar functionality. A letter after a reference designator number represents an instance of an element having the reference designator number.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Multiple application specific signal processors (ASSPs) having the loop buffering of the present invention are provided within gateways in communication systems to provide improved voice and data communication over a packetized network. Each ASSP includes a serial interface, a buffer memory and four core processors in order for each to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel.

Each ASSP is flexible and can be programmed to perform many network functions or data/voice processing functions including voice and data compression/decompression in telecommunication systems (such as CODECs), particularly packetized telecommunication networks, simply by altering the software program controlling the commands executed by the ASSP.

A loop buffer is provided for storing and holding instructions executed within loops for digital signal processing. Control logic detects the beginning and ending of a loop to signal the loop buffer control logic to start instruction execution in a cyclical fashion using the instructions stored within the loop buffer. After completion of the required number of loops, the instructions in the loop buffer are overwritten with new instructions until the next loop is to be processed.

Figure 1A:
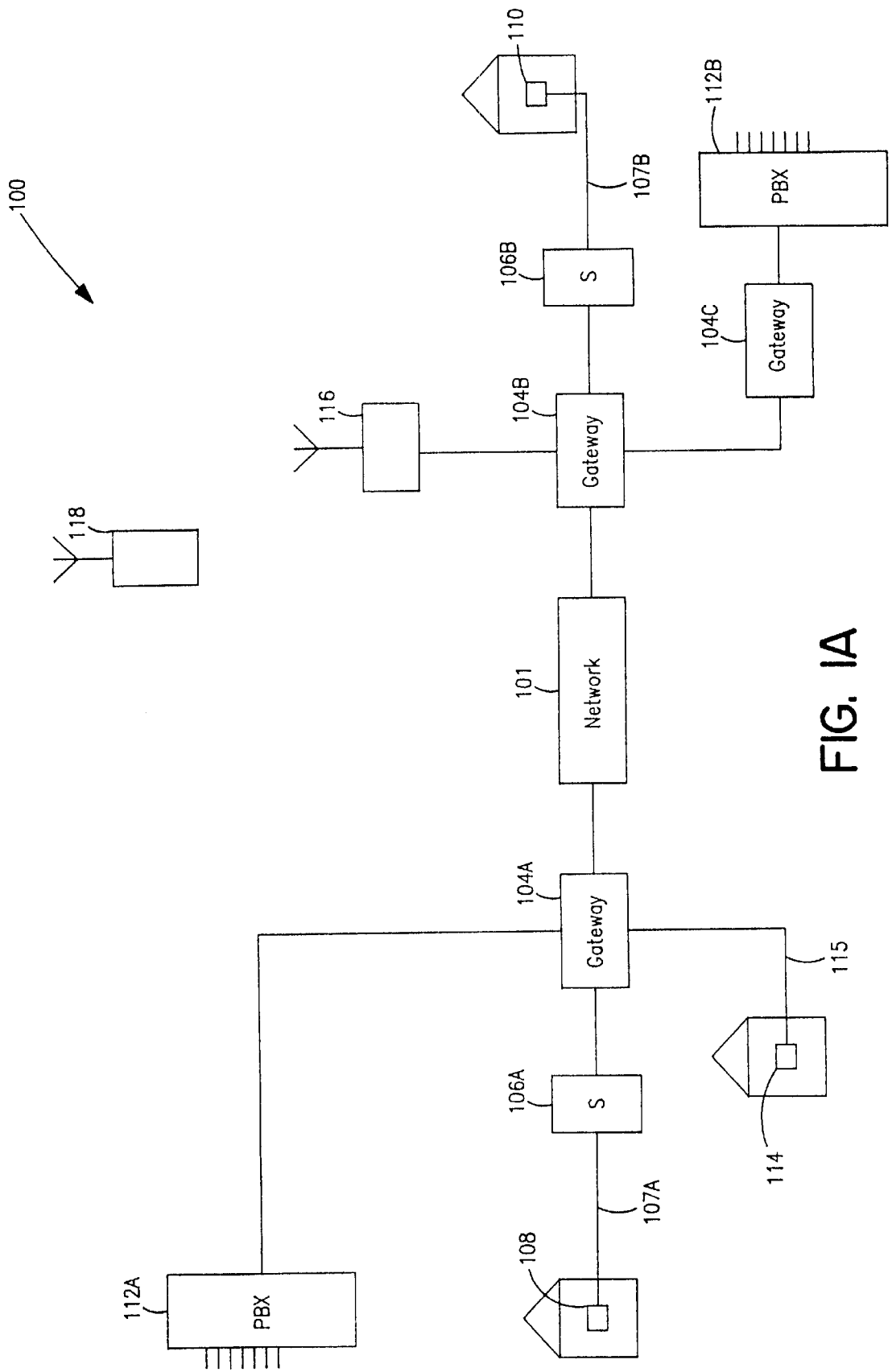
FIG. 1A is a block diagram.of a system utilizing the present invention.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A, 104B, and 104C in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network. (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A, 104B and 104C, incoming signals are packetized for transmission across the network 101. Signals received by the gateways 104A, 104B and 104C from the network 101 are depacketized and transcoded for distribution to the appropriate destination.

Figure 1B:
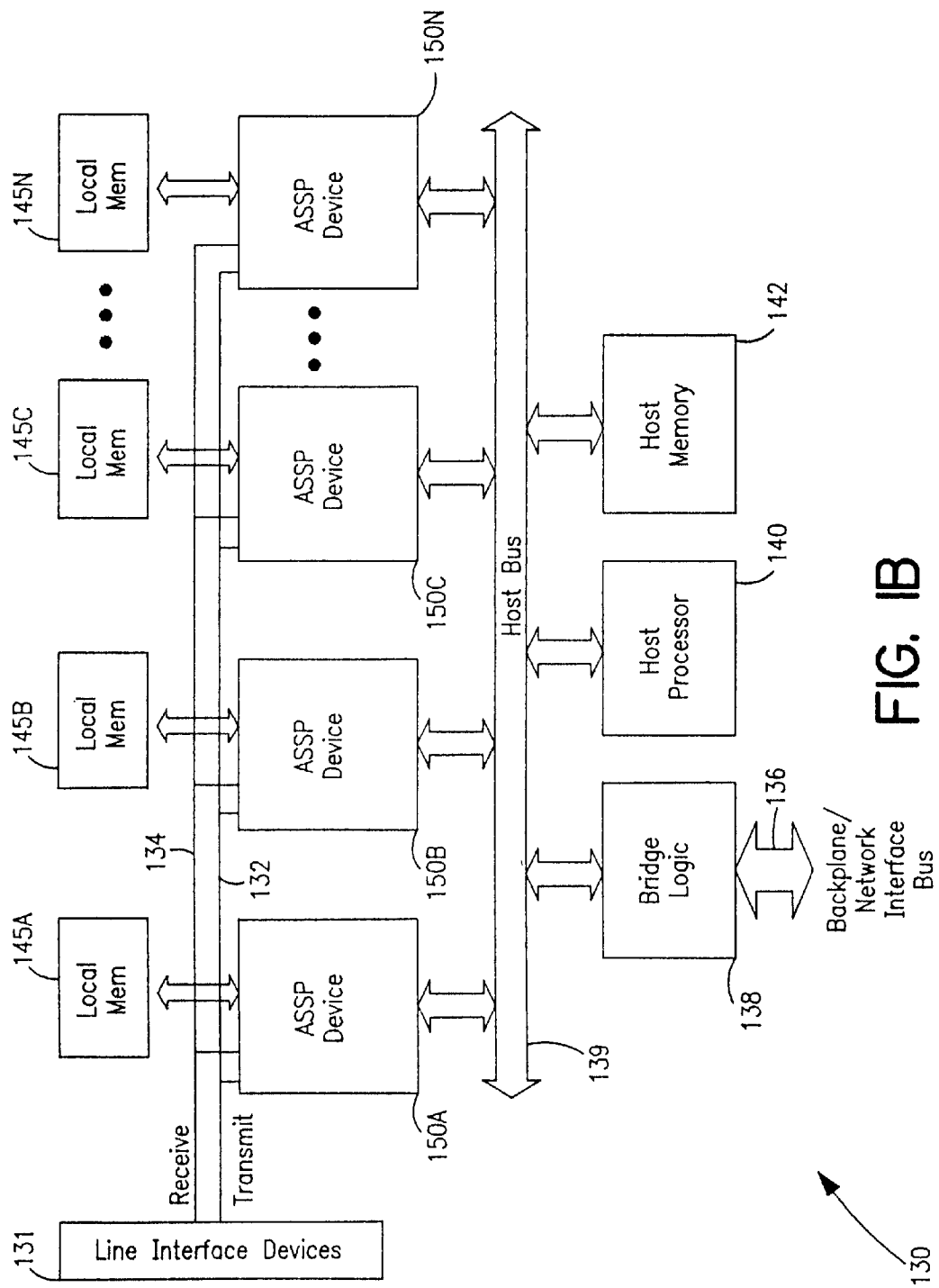
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between backplane/network interface bus 136 and the NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
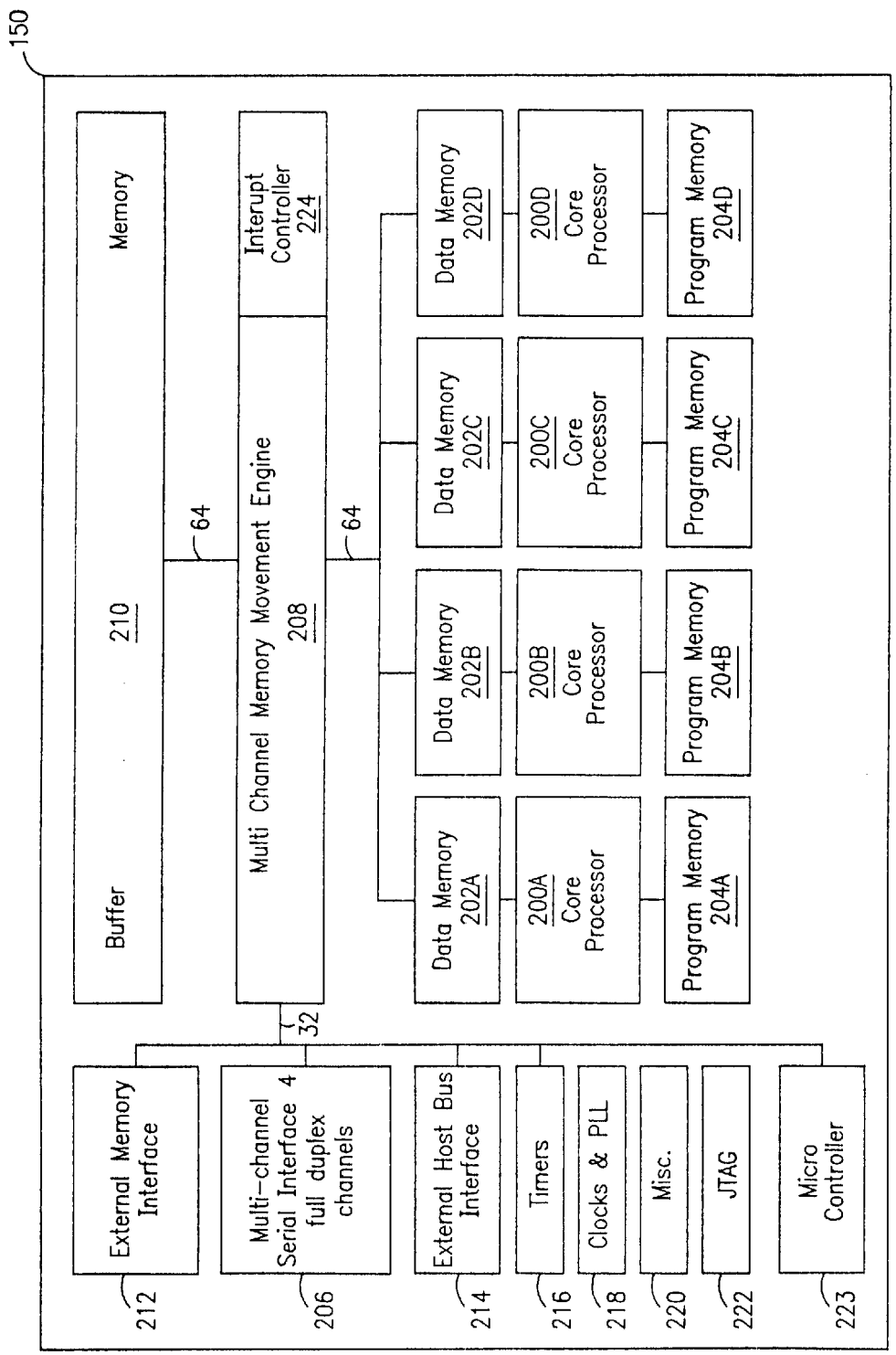
FIG. 2 is a block diagram of the Application Specific Signal Processor (ASSP) of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B. Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
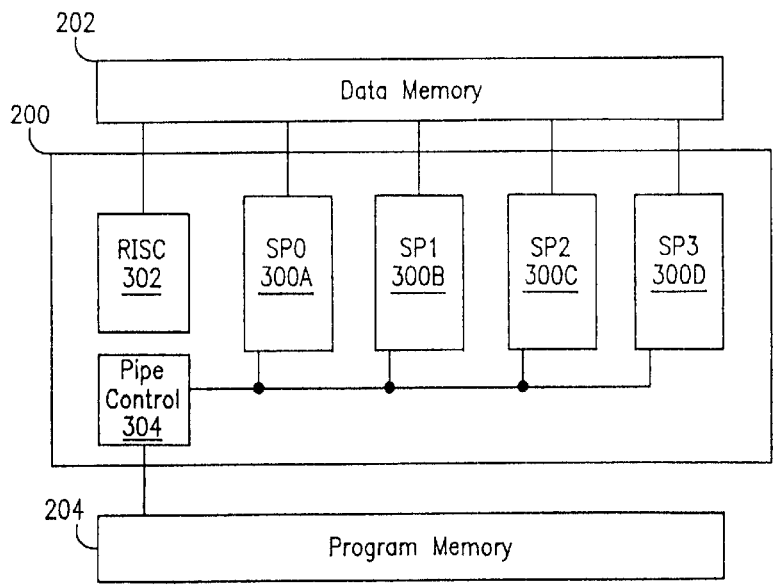
FIG. 3 is a block diagram of an instance of the core processors within the ASSP of the present invention.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory, resulting in very efficient data processing. Thus, the instruction set architecture of the present invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
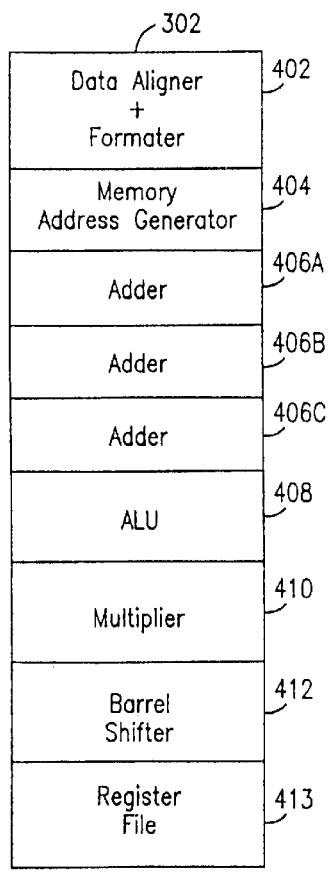
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
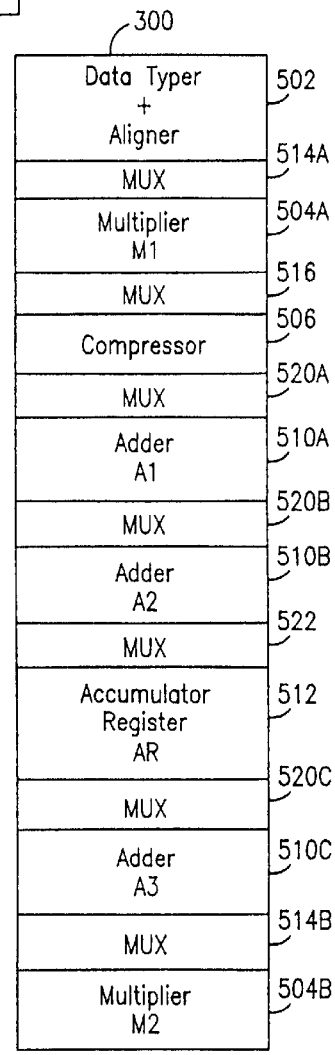
FIG. 5A is a block diagram of an instance of the signal processing units within the core processors of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

Figure 5B:
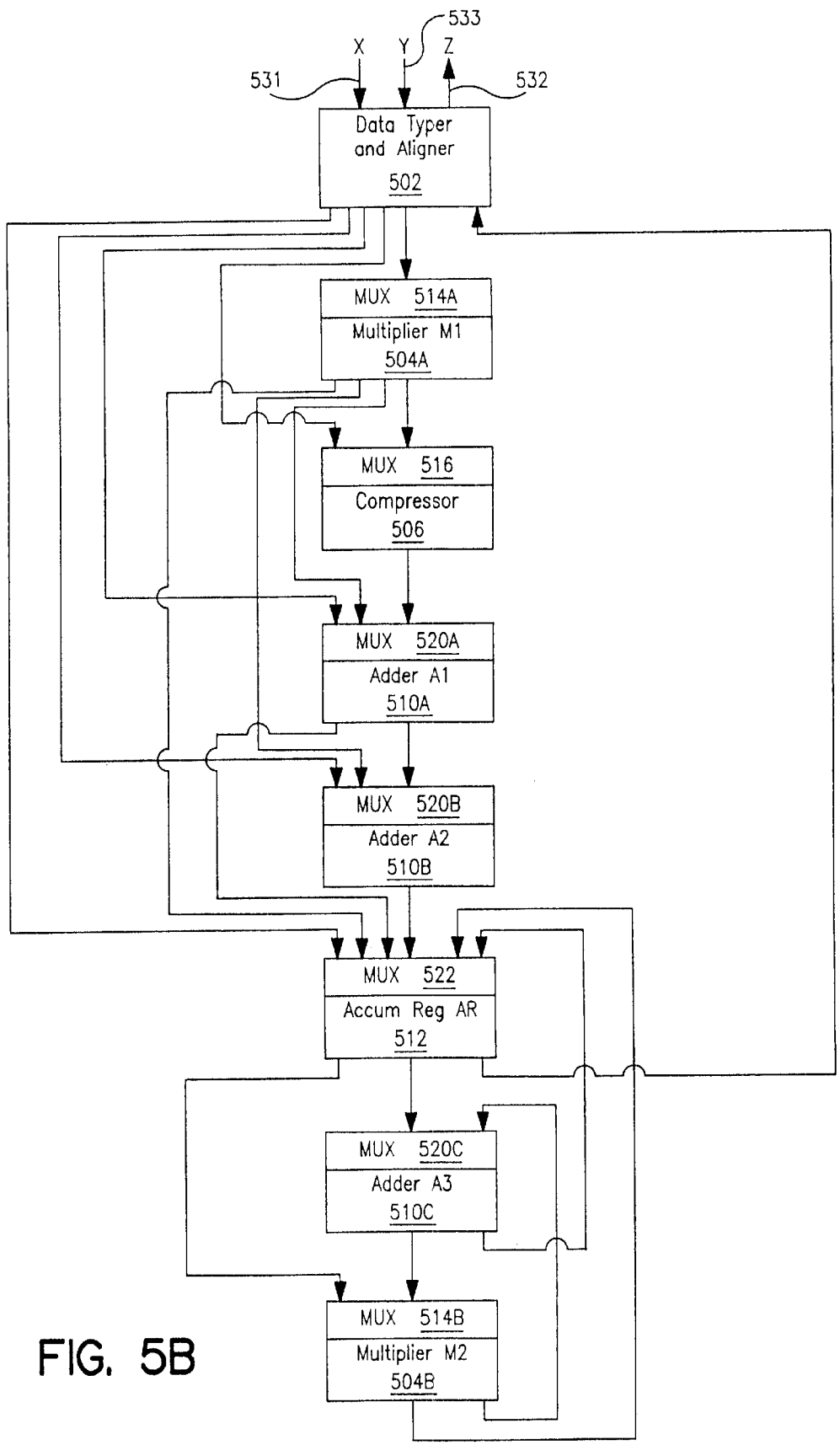
FIG. 5B is a more detailed block diagram of FIG. 5A illustrating the bus structure of the signal processing unit.

Referring now to FIG. 5B, a more detailed block diagram of the functional blocks and the bus structure of the signal processing unit is illustrated. Dyadic DSP instructions are possible because of the structure and functionality provided in each signal processing unit. Output signals are coupled out of the signal processor 300 on the Z output bus 532 through the data typer and aligner 502. Input signals are coupled into the signal processor 300 on the X input bus 531 and the Y input bus 533 through the data typer and aligner 502. Internally, the data typer and aligner 502 has a different data bus to couple to each of multiplier M1 504A, compressor 506, adder A1 510A, adder A2 510B, and accumulator register AR 512. While the data typer and aligner 502 could have data busses coupling to the adder A3 510C and the multiplier M2 504B, in the preferred embodiment it does not in order to avoid extra data lines and conserve area usage of an integrated circuit. Output data is coupled from the accumulator register AR 512 into the data typer and aligner 502. Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512.

Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

Figures 6A, 6B:
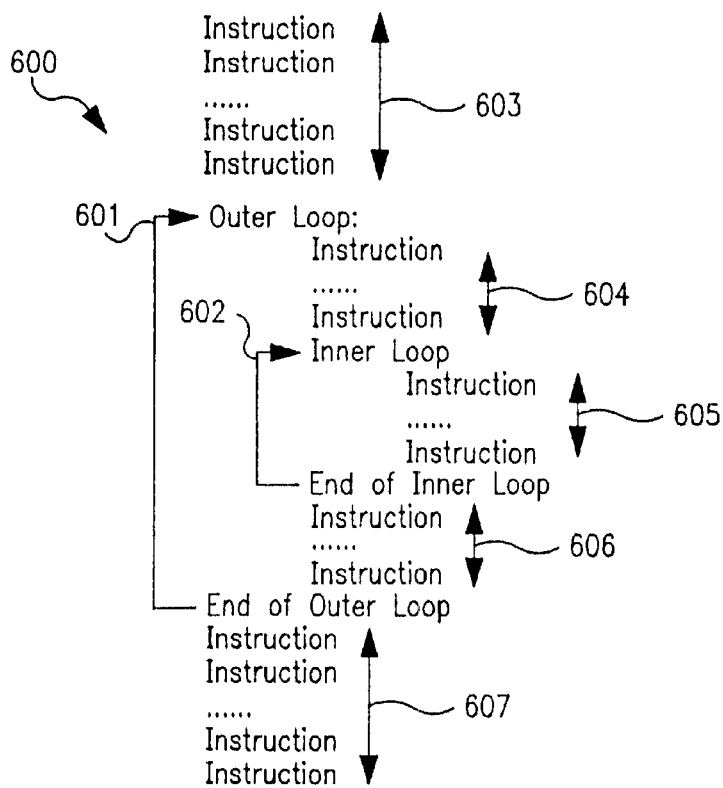
FIG. 6A is an exemplary instruction sequence illustrating a program model for DSP algorithms employing the instruction set architecture of the present invention.
FIG. 6B is a chart illustrating the permutations of the dyadic DSP instructions.
Figure 6H:
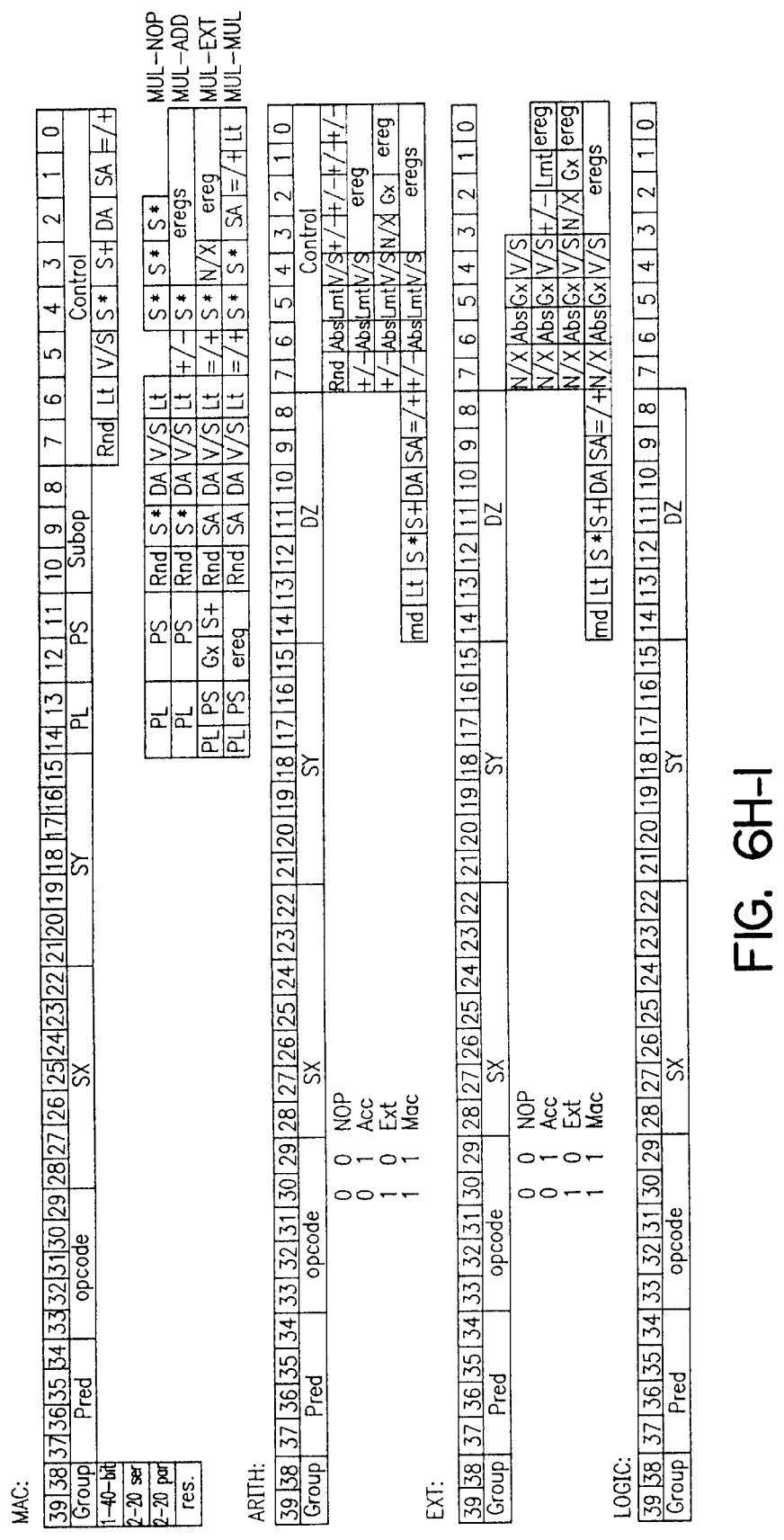

Referring now to FIG. 6A, an exemplary instruction sequence 600 is illustrated for a DSP algorithm program model employing the instruction set architecture of the present invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions which are typically infrequently executed. Instructions 604 are typically to provide the setup for the inner loop 602, other control through 2×20 control instructions, or offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing 300 units in a single instruction multiple data execution mode, memory access for operands, dyadic DSP operations, and other DSP functionality through the 20/40 bit DSP instructions of the ISA of the present invention. Because instructions 605 are so often repeated, significant improvement in operational efficiency may be had by providing the DSP instructions, including general dyadic instructions and dyadic DSP instructions, within the ISA of the present invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, or a 40-bit extended RISC or DSP instruction.

The instruction set architecture of the ASSP 150 has 4 distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor 200 of the type where D=[(A op1 B) op2 C ] and each of "op1" and "op2" can be a multiply, add or extremum (min/max) class of operation on the three operands A, B, and C. The ISA of the ASSP 150 which accelerates these calculations allows efficient chaining of different combinations of operations. Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bit 39 and 19 indicating the type of instruction. After fetching, the instruction is grouped into two sections of 20 bits each for execution of operations. In the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially. In the case of 40-bit DSP instructions (bit 39=1, bit 19=0), the two sections form one extended DSP instruction which are executed simultaneously.

The ISA of the ASSP 150 is fully predicated providing for execution prediction. Within the 20-bit RISC control instruction word and the 40-bit extended DSP instruction word there are 2 bits of each instruction specifying one of four dedicated predicate registers within the RISC control unit 302. Depending upon the condition of the predicate register, instruction execution can conditionally change based on its contents.

In order to access operands within the data memory 202 or registers within the accumulator 512 or register file 413, a 6-bit specifier is used in the DSP extended instructions to access operands in memory and registers. Of the six bit specifier used in the extended DSP instructions, the MSB (Bit 5) indicates whether the access is a memory access or register access. In the preferred embodiment, if Bit 5 is set to logical one, it denotes a memory access for an operand. If Bit 5 is set to a logical zero, it denotes a register access for an operand. If Bit 5 is set to 1, the contents of a specified register (rX where X: 0–7) are used to obtain the effective memory address and post-modify the pointer field by one of two possible offsets specified in one of the specified rX registers. If Bit 5 is set to 0, Bit 4 determines what register set has the contents of the desired operand. If Bit-4 is set to 0, then the remaining specified bits 3:0 control access to the registers within the register file 413 or to registers within the signal processing units 300.

DSP Instructions

There are four major classes of DSP instructions for the ASSP 150 these are:

1) Multiply (MULT): Controls the execution of the main multiplier connected to data buses from memory.
   Controls: Rounding, sign of multiply Operates on vector data specified through type field in address register
   Second operation: Add, Sub, Min, Max in vector or scalar mode
2) Add (ADD): Controls the execution of the main-adder
   Controls: absolute value control of the inputs, limiting the result
   Second operation: Add, add-sub, mult, mac, min, max
3) Extremum (MIN/MAX): Controls the execution of the main-adder
   Controls: absolute value control of the inputs, Global or running max/min with T register, TR register recording control
   Second operation: add, sub, mult, mac, min, max
4) Misc: type-match and permute operations.

The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently. All of the DSP instructions control the multipliers 504A–504B, adders 510A–510C, compressor 506 and the accumulator 512, the functional units of each signal processing unit 300A–300D.

In the 40 bit instruction word, the type of extension from the 20 bit instruction word falls into five categories:

1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) DSP extensions that control the lower rows of functional units within a signal processing unit 300 to accelerate block processing.

The 40-bit control instructions with the 20 bit extensions further allow a large immediate value (16 to 20 bits) to be specified in the instruction and powerful bit manipulation instructions.

Efficient DSP execution is provided with 2×20-bit DSP instructions with the first 20-bits controlling the top functional units (adders 501A and 510B, multiplier 504A, compressor 506) that interface to data buses from memory and the second 20 bits controlling the bottom functional units (adder 510C and multiplier 504B) that use internal or local data as operands. The top functional units, also referred to as main units, reduce the inner loop cycles in the inner loop 602 by parallelizing across consecutive taps or sections. The bottom functional units cut the outer loop cycles in the outer loop 601 in half by parallelizing block DSP algorithms across consecutive samples.

Efficient DSP execution is also improved by the hardware architecture of the present invention. In this case, efficiency is improved in the manner that data is supplied to and from data memory 202 to feed the four signal processing units 300 and the DSP functional units therein. The data highway is comprised of two buses, X bus 531 and Y bus 533, for X and Y source operands and one Z bus 532 for a result write. All buses, including X bus 531, Y bus 533, and Z bus 532, are preferably 64 bits wide. The buses are uni-directional to simplify the physical design and reduce transit times of data. In the preferred embodiment when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

Dyadic DSP Instructions

All DSP instructions of the instruction set architecture of the ASSP 150 are dyadic DSP instructions within the 20 bit or 40 bit instruction word. A dyadic DSP instruction informs the ASSP in one instruction and one cycle to perform two operations. Referring now to FIG. 6B is a chart illustrating the permutations of the dyadic DSP instructions.

The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the present invention can be generalized to combining any pair of basic DSP operations to provide very powerful dyadic instruction combinations. Compound DSP operational instructions can provide uniform acceleration for a wide variety of DSP algorithms not just multiply-accumulate intensive filters. The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

Referring now to FIG. 6C and FIG. 6D, bitmap syntax for an exemplary dyadic DSP instruction is illustrated. FIG. 6C illustrates bitmap syntax for a control extended dyadic DSP instruction while FIG. 6D illustrates bitmap syntax for a non-extended dyadic DSP instruction. In the non-extended bitmap syntax the instruction word is the twenty most significant bits of a forty bit word while the extended bitmap syntax has an instruction word of forty bits. The three most significant bits (MSBs), bits numbered 37 through 39, in each indicate the MAIN OP instruction type while the SUB OP is located near the middle or end of the instruction bits at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected.

In the case of MULT as the MAIN OP, the SUB OPs are 000 for NOP, 001 or 010 for ADD, 100 or 011 for a negative ADD or subtraction, 101 or 110 for MIN, and 111 for MAX. In the preferred embodiment, the MAIN OP and the SUB OP are not the same DSP instruction although alterations to the hardware functional blocks could accommodate it. The lower twenty bits of the control extended dyadic DSP instruction, the extended bits, control the signal processing unit to perform rounding, limiting, absolute value of inputs for SUB OP, or a global MIN/MAX operation with a register value.

The bitmap syntax of the dyadic DSP instruction can be converted into text syntax for program coding. Using the multiplication or MULT non-extended instruction as an example, its text syntax for multiplication or MULT is (vmul|vmuln).(vadd|vsub|vmax|sadd|ssub|smax) da, sx, sa, sy [,(ps0)|ps1)]

The "vmul|vmuln" field refers to either positive vector multiplication or negative vector multiplication being selected as the MAIN OP. The next field, "vadd|vsub|vmax|sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[,(ps0) |ps1)]" refers to pair selection of keyword PS0 or PS1 specifying which are the source-destination pairs of a parallel-store control register.

Referring now to FIGS. 6E and 6F, lists of the set of 20-bit DSP and control instructions for the ISA of the present invention is illustrated. FIG. 6G lists the set of extended control instructions for the ISA of the present invention. FIG. 6H lists the set of 40-bit DSP instructions for the ISA of the present invention. FIG. 6I lists the set of addressing instructions for the ISA of the present invention.

Loop Buffering

Referring now to FIG. 7, a functional block diagram illustrates the instruction fetching and loop buffering for the signal processing units 300. Referring momentarily back to FIG. 3, the pipe control 304 couples to the RISC control unit 302 and the program memory 204 to provide the control of the signal processing units 300 in a core processor 200. Referring now to FIG. 7, the pipe control 304 of each core processor 200, includes an F0 fetch control stage 700, an F1 fetch control stage 701 and a D0 predecoding stage 702 coupled as shown in FIG. 7. The F0 fetch control stage 700 in conjunction with the RISC control unit 302 generate addresses to fetch new instructions from the program memory 204. F1 fetch control stage 701 receives the newly fetched instructions. F1 fetch control stage 701 includes a loop buffer 710 to store and hold instructions for execution within a loop and an instruction register 711 coupled to the instruction output 714 of the loop buffer 710 to store the next instruction for predecoding by the D0 predecoding stage 702. The output 714 from the loop buffer 710 is stored into the instruction register 711 to generate the output 714 which is coupled into the D0 predecoding stage 702. The registers in the loop buffer 710 are additionally used for temporary storage of new instructions when an instruction stall in a later pipeline stage (not shown) causes the entire execution pipeline to stall for one or more clock cycles. Referring momentarily back to FIG. 6A, the loop buffer 710 stores and holds instructions that are executed during a loop such as instructions 604 and 606 for the outer loop 601 or instructions 605 for the inner loop 602. The D0 predecoding stage 702 receives instructions from the F1 fetch control stage 701 and predecodes them into preliminary signals 703 for coupling to the appropriate final decoders. The final decoders (not shown) appropriately select the multiplexers of each signal processing unit for a given instruction in response to the preliminary signals 703 allowing the data path of the signal processors 300 to be reconfigured by the software instruction in each cycle.

Referring now to FIG. 7, each of the blocks in the pipe control 304 have control logic to control the instruction fetching and loop buffering for the signal processing units 300 of the core processor 200. The RISC control unit 302 signals to the F0 Fetch control stage 700 to fetch a new instruction. F0 Fetch control stage 700 generates an address on the address bus 712 coupled into the program memory 204 address a memory location of a new instruction. The instruction is signaled onto the data bus 713 from the program memory 204 and coupled to the loop buffer 710 of the F1 fetch control stage 701. The loop buffer 710 momentarily stores the instruction unless a loop is encountered which can be completely stored therein.

The loop buffer 710 is a first in first out (FIFO) type of buffer. That is, the first instruction stored in the FIFO represents the first instruction output which is executed. If a loop is not being executed, the instructions fall out of the loop buffer 710 and are overwritten by the next instruction. If the loop buffer 710 is operating in a loop, the instructions circulate within the loop buffer 710 from the first instruction within the loop (the "first loop instruction") to the last instruction within the loop (the "last loop instruction"). The depth N of the loop buffer 710 is coordinated with the design of the pipeline architecture of the signal processing units and the instruction set architecture. The deeper the loop buffer 710, the larger the value of N, the more complicated the pipeline and instruction set architecture. In the preferred embodiment, the loop buffer 710 has a depth N of four to hold four dyadic DSP instructions of a loop. Four dyadic DSP instructions are the equivalent of up to eight prior art DSP instructions which satisfies a majority of DSP program loops while maintaining reasonable complexity in the pipeline architecture and the instruction set architecture.

The loop buffer 710 differs from cache memory which are associated with microprocessors. The loop buffer stores instructions of a program loop ("looping instructions") in contrast to a cache memory that typically stores a quantity of program instructions regardless of their function or repetitive nature. To accomplish the storage of loop instructions, as instructions are fetched from program memory 204, they are stored in the loop buffer and executed. The loop buffer 710 continues to store instructions read from program memory 204 in a FIFO manner until receiving a loop buffer cycle (LBC) signal 715 indicating that one complete loop of instructions has been executed and stored in the loop buffer 710. After storing a complete loop of instructions in the loop buffer 710, there is no need to fetch the same instructions over again to repeat the instructions. Upon receiving the LBC signal 715, instead of fetching the same instructions within the loop from program memory 204, the loop buffer is used to repeatedly output each instruction stored therein in a circular fashion in order to repeat executing the instructions within the sequence of the loop. The loop buffer cycle signal LBC 715 is generated by the control logic within the D0 predecoding stage 702. The loop buffer cycle signal LBC 715 couples to the F1 fetch control stage 701 and the F0 fetch control stage 700. The LBC 715 signals to the F0 fetch control stage 700 that additional instructions need not be fetched while executing the loop. In response the F0 fetch control stage remains idle such that power is conserved by avoiding the fetching of additional instructions. The control logic within the F1 fetch control stage 701 causes the loop buffer 710 to circulate its instruction output 714 provided to the D0 predecoding stage 702 in response to the loop buffer cycle signal 715. Upon completion of the loop, the loop buffer cycle signal 715 is deasserted and the loop buffer returns to processing standard instructions until another loop is to be processed.

In order to generate the loop buffer cycle signal 715, the first loop instruction that starts the loop needs to be ascertained and the total number of instructions or the last loop instruction needs to be determined. Additionally, the number of instructions in the loop, that is the loop size, can not exceed the depth N of the loop buffer 710. In order to disable the loop buffer cycle signal 715, the number of times the loop is to be repeated needs to be determined.

The first loop instruction that starts a loop can easily be determined from a loop control instruction that sets up the loop. Loop control instructions can set up a single loop or one or more nested loops. In the preferred embodiment a single nested loop is used for simplicity. The loop control instructions are LOOP and LOOPi of FIG. 6F for a single loop and DLOOP and DLOOPi of FIG. 6G for a nested loop or dual loops. The LOOPi and DLOOPi instructions provide the loop values indirectly by pointing to registers that hold the appropriate values. The loop control instruction indicates how many instructions away does the first instruction of the loop begin in the instructions that follow. In the present invention, the number of instructions that follows is three or more. The loop control instruction additionally provides the size (i.e., the number of instructions) of the loop. For a nested loop, the loop control instruction (DLOOP or DLOOPi) indicates how many instructions away does the nested loop begin in the instructions that follow. If an entire nested loop can not fit into the loop buffer, only the inner loops that do fit are stored in the loop buffer while they are being executed. While the nesting can be N loops, in the preferred embodiment, the nesting is two. Upon receipt of the loop control instruction a loop status register is set up. The loop status register includes a loop active flag, an outer loop size, an inner loop size, outer loop counter value, and inner loop count value. Control logic compares the value of the loop size from the loop status register with the depth N of the loop buffer 710. If the size of the loop is less than or equal to the depth N, when the last instruction of the loop has been executed for the first time (i.e. the first pass through the loop), the loop buffer cycle signal 715 can be asserted such that instructions are read from the loop buffer 710 thereafter and decoded by the predecoder 702. The loop control instruction also includes information regarding the number of times a loop is to be repeated. The control logic of the predecoder 702 includes a counter to count the number of times the loop of instructions has been executed. Upon the count value reaching a number representing the number of times the loop was to be repeated, the loop buffer cycle signal 715 is deasserted so that instructions are once again fetched from program memory 204 for execution.

Referring now to FIG. 8A, a block diagram of the loop buffer 710A and its control of a first embodiment are illustrated. The loop buffer 710A includes a multiplexer 800, a series of N registers, registers 802A through 802N, and a multiplexer 804. Multiplexer 804 selects whether one of the register outputs of the N registers 802A through 802N or the fetched instruction on data bus 713 from program memory 204 is selected (bypassing the N registers 802A through 802N) as the output from the loop buffer 710. The number of loop instructions controls the selection made by multiplexer 804. If there are no loop instructions, multiplexer 804 selects to bypass registers 802A through 802N. If one loop instruction is stored, the output of register 802A is selected by multiplexer 804 for output. If two loop instructions are stored in the loop buffer 710, the output of register 802B is selected by multiplexer 804 for output. If N loop instructions are stored in the loop buffer 710, the output from the Nth register within the loop buffer 710, the output of register 802N, is selected by multiplexer 804 for output. The loop buffer cycle (LBC) signal 715, generated by the logic 818, controls multiplexer 800 to select whether the loop buffer will cycle through its instructions in a circular fashion or fetch instructions from program memory 204 for input into the loop buffer 710. A clock is coupled to each of the registers 802A through 802N to circulate the instructions stored in the loop buffer 710 through the loop selected by the multiplexers 804 and 800 in the loop buffer 710. By cycling through the instructions in a circular fashion, the loop buffer emulates the fetching process that might ordinarily occur into program memory for the loop instructions. Note that the clock signal to each of the blocks is a conditional clock signal that may freeze during the occurrence of a number of events including an interrupt.

To generate the control signals for the loop buffer 710, the pipe control 304 includes a loop size register 810, a loop counter 812, comparators 814–815, and control logic 818. The loop size register 810 stores the number of instructions within a loop to control the multiplexer 804 and to determine if the loop buffer 710 is deep enough to store the entire set of loop instructions within a given loop. Comparator 814 compares the output of the loop size register 810 representing the number of instructions within a loop with the loop buffer depth N. If the number of loop instructions exceeds the loop buffer depth N, the loop buffer 710 can not be used to cycle through instructions of the loop. Loop counter 812 determines how may loops have been executed using the loop instructions stored in the loop buffer by generating a loop count output. Comparator 815 compares the loop count output from the loop counter 812 with the predetermined total number of loops to determine if the last loop is to be executed.

The loop control also includes an option for early loop exit (i.e., before the loop count has been exhausted) based on the value of a predicate register. The predicate register is typically updated on each pass through the loop by an arithmetic or logical test instruction inside the loop. The predicate register (not shown) couples to the comparator 815 by means of a signal line, early exit 816. When the test sets a FALSE condition in the predicate register signaling to exit early from the loop on early exit 816, the comparator 815 overrides the normal comparison between the loop count and the total number of loops and signals to logic 818 that the last loop is to be executed.

Upon completing the execution of the last loop, the loop buffer cycle signal 715 is disabled in order to allow newly fetched instructions to be stored within the loop buffer 710.

The control logic 818 accepts the outputs from the comparators 814 and 815 in order to properly generate (assert and deassert) the loop buffer cycle signal LBC 715.

Referring now to FIG. 8B, a detailed block diagram of the loop buffer and its control circuitry of a preferred embodiment is illustrated. The loop buffer 710B includes a set of N registers, registers 803A–803N, and the multiplexer 804. The loop buffer 710B is preferable over the loop buffer 710A in that registers 803A–803N need not be clocked to cycle through the instructions of a loop thereby conserving additional power. As compared to the loop buffer 710A and its control illustrated in FIG. 8A, registers 803A–803N replace registers 802A–802N, multiplexer 804 is controlled differently by a read select pointer 832 and the output of the comparator 814, and a write select pointer 830 selectively enables the clocking of registers 803A–803N. The clock signal to each of the blocks is a conditional clock signal that may freeze during the occurrence of a number of events including an interrupt.

The write select pointer 830, essentially a flexible encoder, encodes a received program fetch address into an enable signal to selectively load one of the registers 803A–803N with an instruction during its execution in the first cycle of a loop. The program fetch address is essentially the lower order bits of the program counter delayed in time. As each new program fetch address is received, the write select pointer 830 appropriately enables one of the registers 803A–803N in order as they would be executed in a loop. Once all instructions of a loop are stored within one or more of the registers 803A–803N, the write select pointer 830 disables all enable inputs to the registers 803A–803N until a next loop is ready to be loaded into the loop buffer 710B.

The read select pointer 832, essentially a loadable counter tracking the fetch addresses, is initially loaded with a beginning loop address (outer or inner loop beginning address) at the completion of the first cycle of a loop and incremented to mimic the program counter functioning in a loop. Multiplexer 804 selects the output of one of the registers 803A–803N as its output and the instruction that is to be executed on the next cycle in response to the output from the read select pointer 832. Nested loops (i.e. inner loops) are easily handled by reloading the read select pointer with the beginning address of the nested loop each time the end of the nested loop is encountered unless ready to exit the nested loop.

During the initialization of the loop buffer, when the registers 803A–803N are loaded with instructions, the read select pointer 832 controls the multiplexer 804 such that the instructions ("data") from program memory flow through the loop buffer 710B out to the instruction output 714. The occurrence of a loop control instruction loads the loop size register 810 with the number of instructions within the loop.

The comparator 814 compares the number of instructions within the loop with the depth N of the loop buffer 710B. If the number of instructions within the loop exceeds the depth N of the loop buffer, the enable loop buffer signal is not asserted such that the multiplexer 804 selects the flow through input to continue to have instructions flow through the loop buffer 710B for all cycles of the loop. If the total number of instructions from the inner and outer loops do not fit within the depth of the loop buffer 710B, the inner loop may still have its instructions loaded into the loop buffer 710B to avoid the fetching process during the cycle through the inner loop to conserve power.

Upon the completion of loading instructions within the depth of the loop buffer 710B or when an outer loop end is reached and the loop needs to loop back, the read select pointer 832 is loaded by the loop back signal with the outer loop start address through multiplexer 831 and the loop select signal. If an inner loop is nested within the outer loop and the inner loop is supposed to loop back, the multiplexer 831 selects the inner loop start address to be loaded into the read select pointer 832 by the loop select signal when an end of an inner loop is reached.

The preferred embodiments of the present invention are thus described. As those of ordinary skill will recognize, the present invention has many advantages. One advantage of the present invention is that power consumption is reduced when executing instructions within loops.

While the present invention has been described in particular embodiments, it may be implemented in hardware, software, firmware or a combination thereof and utilized in systems, subsystems, components or sub-components thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A loop buffer comprising:

a plurality of registers coupled in series together to store instructions, the first register having an input and an output, the output of the first register coupled to the input of the next register in the series, the last register having an input coupled to the output of the prior register in the series and an output onto which to provide the stored instructions, registers between the first and last registers having an input coupled to the prior register in the series and an output coupled to the next register in the series;

the output of the last register in the series selectively coupled to the input of the first register in the series in response to the plurality of registers storing a loop of instructions; and wherein the number of instructions within the loop selects the last register in the series of registers having an output selectively coupled to the input of the first register.

2. The loop buffer of claim 1, wherein, the series of registers are clocked in order to cycle through the loop of instructions stored in the loop buffer during the execution of a loop.

3. A loop buffer comprising:

a plurality of registers coupled in series together to store instructions, the first register having an input and an output, the output of the first register coupled to the input of the next register in the series, the last register having an input coupled to the output of the prior register in the series and an output onto which to provide the stored instructions, registers between the first and last registers having an input coupled to the prior register in the series and an output coupled to the next register in the series;

the output of the last register in the series selectively coupled to the input of the first register in the series in response to the plurality of registers storing a loop of instructions; and a first multiplexer having an output coupled to the input of the first register in the series, the first multiplexer selecting the output from the last register or a new instruction from memory to input into the first register in the series.

4. The loop buffer of claim 3, wherein:

the first multiplexer selects the output from a second multiplexer or a new instruction from memory to input into the first register in the series; and the second multiplexer selects the output from the series of registers as an instruction execution output in response to the number of instructions within the loop.

5. The loop buffer of claim 3, wherein, the series of registers are clocked in order to cycle through the loop of instructions stored in the loop buffer during the execution of a loop.

6. A loop buffer comprising:

a plurality of registers to store instructions within a loop;

a first pointer coupled to each of the plurality of registers to selectively enable the loading of an instruction into one of the plurality of registers;

a second pointer to selectively read an instruction from the plurality of registers as the next instruction for execution within the loop; and a multiplexer coupled to an output of each of the plurality of registers and the second pointer, the multiplexer to select one output of the plurality of registers in response to the second pointer in order to selectively read the instruction therein as the next instruction for execution within the loop.

7. The loop buffer of claim 6, wherein, the second pointer is loaded with the starting address of a first loop and is incremented to select a sequence of instructions for execution within the first loop.

8. The loop buffer of claim 7, wherein, the second pointer is loaded with the starting address of a second loop within the first loop and is incremented to select a sequence of instructions for execution within the second loop.

9. The loop buffer of claim 7, wherein, upon the second pointer being incremented to the address of the last instruction within the first loop, the second pointer is reloaded with the starting address of the first loop and incremented to select the sequence of instructions for repeat execution within the first loop.

10. The loop buffer of claim 8, wherein, upon the second pointer being incremented to the address of the last instruction within the second loop, the second pointer is reloaded with the starting address of the second loop and incremented to select the sequence of instructions for repeat execution within the second loop.

11. The loop buffer of claim 10, wherein, upon the second pointer being incremented to the address of the last instruction within the first loop, the second pointer is reloaded with the starting address of the first loop and incremented to select the sequence of instructions for repeat execution within the first loop.

12. The loop buffer of claim 6, wherein, the first pointer is loaded with the fetch address of each instruction within the loop to selectively enable each of the plurality of registers to store each instruction of the sequence of instructions within the loop therein.

13. A loop buffer comprising:

a plurality of registers to store instructions within a loop;

a first pointer coupled to each of the plurality of registers to selectively enable the loading of an instruction into one of the plurality of registers;

a second pointer to selectively read an instruction from the plurality of registers as the next instruction for execution within the loop; and a comparator to compare the number of the plurality of registers with the number of instructions within the loop, and if the comparator determines that the number of instructions within the loop exceeds the number of the plurality of registers, the comparator to disable the loop buffer and cause the instructions within the loop to flow through the loop buffer for execution.

14. The loop buffer of claim 13, wherein, the plurality of registers to further store instructions in response to a stall in an instruction pipeline, and the second pointer to selectively read an instruction from the plurality of registers as the next instruction for execution in response to the stall being cleared.

* * * * *